United States Patent
Kucik

(10) Patent No.: US 6,712,312 B1
(45) Date of Patent: Mar. 30, 2004

(54) RECONNAISSANCE USING UNMANNED SURFACE VEHICLES AND UNMANNED MICRO-AERIAL VEHICLES

(75) Inventor: Daniel Kucik, Lynn Haven, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/354,507

(22) Filed: Jan. 31, 2003

(51) Int. Cl.$^7$ .............................................. B64C 33/02
(52) U.S. Cl. ........................................ 244/1 R; 244/72
(58) Field of Search ................................ 244/1 R, 3.11, 244/2, 118.1, 119, 136, 900, 903, 904, 72

(56) References Cited

U.S. PATENT DOCUMENTS

| | | | | |
|---|---|---|---|---|
| 3,715,668 A | * | 2/1973 | Herring et al. ................ | 455/96 |
| 3,778,007 A | * | 12/1973 | Kearney et al. ............ | 244/3.14 |
| 3,962,537 A | * | 6/1976 | Kearns et al. ............... | 348/144 |
| 4,296,894 A | * | 10/1981 | Schnabele et al. ......... | 244/3.27 |
| 5,186,414 A | * | 2/1993 | Holzschuh et al. ........ | 244/3.12 |
| 5,377,164 A | * | 12/1994 | Almstrom et al. .......... | 367/131 |
| 5,615,847 A | * | 4/1997 | Bourlett ........................ | 244/63 |
| 6,082,671 A | * | 7/2000 | Michelson .................... | 244/72 |
| 6,446,909 B1 | * | 9/2002 | Michelson .................... | 244/72 |
| 6,540,179 B2 | * | 4/2003 | Henderson .............. | 244/135 A |
| 6,615,165 B2 | * | 9/2003 | Carroll .......................... | 703/3 |
| 2003/0089820 A1 | * | 5/2003 | Martorana et al. ........... | 244/3.1 |

OTHER PUBLICATIONS

"Micro Aerial Vehicles (MAVs)"; www.air–attack.com; pp. 1–5.*
Carter, John; "Tiny Spies in the Sky", The Florida Times-Union.*
"Report of the 3$^{rd}$ Annual Micro Aerial Vehicle Competition of Exposition"; May 7–8, 1999, pp. 1–2.*

* cited by examiner

Primary Examiner—Charles T. Jordan
Assistant Examiner—Stephen A Holzen
(74) Attorney, Agent, or Firm—Donald G. Peck; Harvey A. Gilbert

(57) ABSTRACT

A reconnaissance system and method utilizes an unmanned surface vehicle (USV) and at least one micro-aerial vehicle (MAV). The MAV, equipped for unmanned flight after a launch thereof, is mounted on the USV. Each MAV has onboard wireless communications coupled to an onboard video surveillance system. Each MAV launched into the air collects video data using its video surveillance and transmits the video data using its wireless communications.

16 Claims, 3 Drawing Sheets

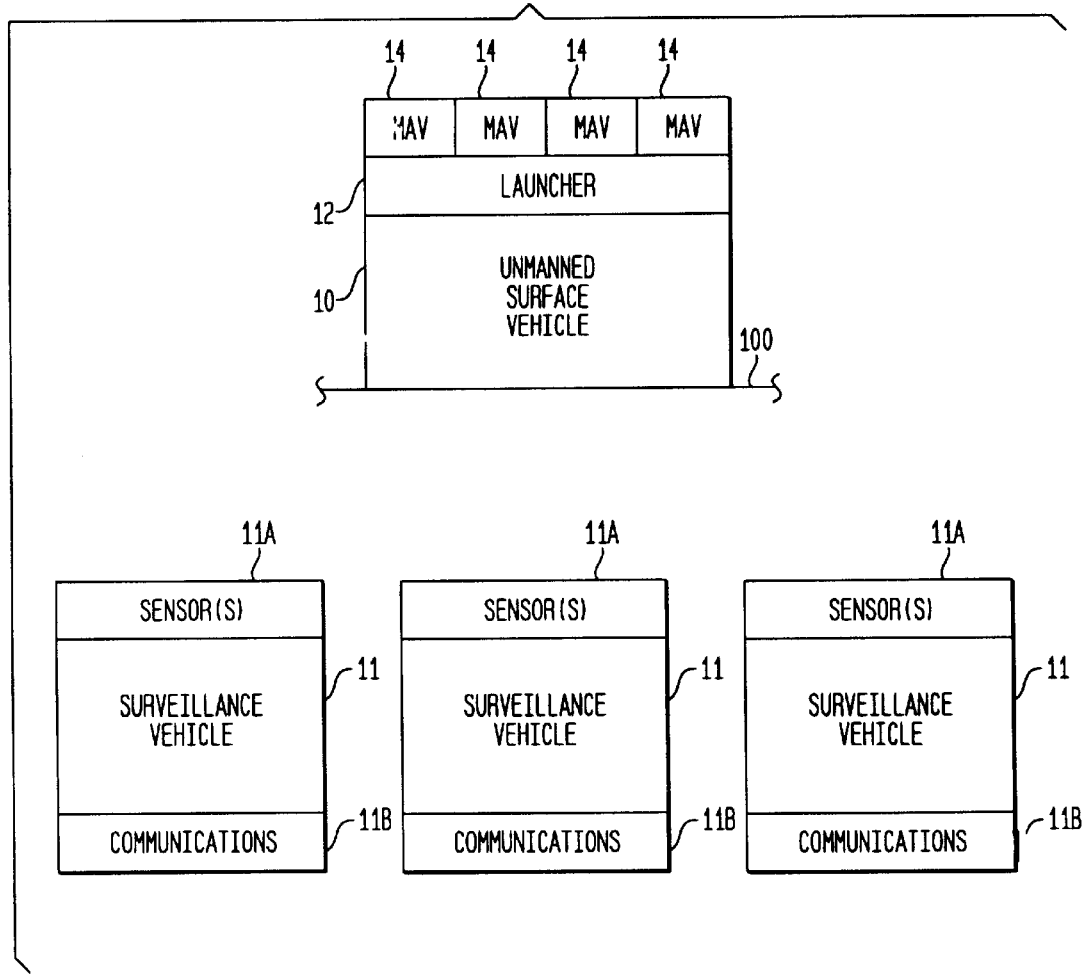

RECONNAISSANCE USING UNMANNED SURFACE VEHICLES AND UNMANNED MICRO-AERIAL VEHICLES

CROSS-REFERENCE TO RELATED PATENT APPLICATIONS

This patent application is co-pending with one related patent application entitled "COMMUNICATIONS USING UNMANNED SURFACE VEHICLES AND UNMANNED MICRO-AERIAL VEHICLES" (Navy Case No. 84141), by the same inventor as this patent application.

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to reconnaissance systems and methods, and more particularly to a method and system of performing video reconnaissance of an area using unmanned surface vehicles and unmanned micro-aerial vehicles.

BACKGROUND OF THE INVENTION

Reconnaissance of surface areas on the earth using orbiting satellites can provide a broad overview of an area each time the satellite passes over the area. However, there are a variety of military and civilian situations that require a greater amount of reconnaissance detail or require that the reconnaissance data be provided during a time when either no reconnaissance satellite is in position or no satellite receiver is available. In such cases, personnel are typically deployed in the area either on foot or in vehicles in order to perform the necessary reconnaissance. However, such deployment can be dangerous, e.g., in enemy territory, in fires or other disaster-stricken areas, in areas of toxic spills or leaks, in harsh environments, etc. Additionally, areas to be reconnoitered may be remote thereby making personnel deployment too impractical or expensive. The same is true for situations or areas that must be monitored for a longer period of time.

SUMMARY OF THE INVENTION

Accordingly, it is an object of the present invention to provide a method and system for performing reconnaissance.

Another object of the present invention is to provide a method and system for performing reconnaissance in an unmanned fashion.

Still another object of the present invention is to provide a method and system for performing unmanned reconnaissance using both surface and micro-aerial vehicles.

Other objects and advantages of the present invention will become more obvious hereinafter in the specification and drawings.

In accordance with the present invention, a reconnaissance system includes an unmanned surface vehicle (USV) capable of navigated movement on an earth surface. At least one micro-aerial vehicle (MAV), equipped for unmanned flight after a launch thereof, is mounted on the USV. Each MAV has onboard wireless communications coupled to an onboard video surveillance system. A launcher mounted on the USV is used to launch each MAV into the air. Each MAV so-launched into the air collects video data using its video surveillance system and transmits the video data using its wireless communications.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 depicts an operational scenario of a system using an unmanned surface vehicle and micro-aerial vehicles in accordance with the present invention where

-and FIG. 4 depicts another operational scenario in accordance with the present invention.

DETAILED DESCRIPTION OF THE INVENTION

Figure 1A:
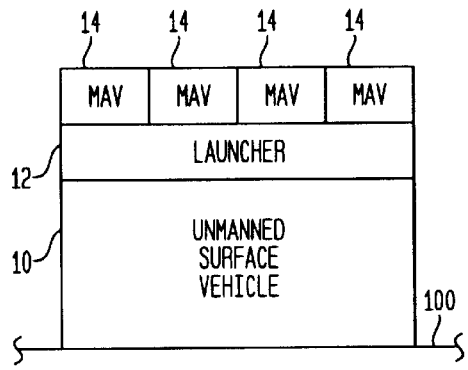
FIGS. 1A–1D depict a time progression in the operation scenario.

Referring now to the drawings, and more Particularly to FIGS. 1A–1D, an operational scenario is depicted for a system that can carry out reconnaissance and/or communications in accordance with the present invention. For simplicity of description, ea of the reconnaissance and communications aspects of the present invention will be explained as separate operations. However, it is to be understood that the operations could be combined and provided by one system.

With respect to the reconnaissance aspect of the present invention, an unmanned surface vehicle (USV) 10 is provided and is capable of navigated movement on a surface 100 of the earth. Surface 100 can be the ground (to include dry land and the seafloor), or can be the surface of a body of water. Accordingly, USV 10 can be a ground-based vehicle or a floating vehicle without departing from the scope of the present invention. USV 10 can navigate autonomously to a desired location or can have its navigated movement controlled from a remote location.

Incorporated into or mounted on USV 10 is a launcher 12 for launching one or more micro-aerial vehicles (MAV) 14 from USV 10. As is known in the art, each MAV 14 is a small, unmanned aircraft (e.g., wingspan on the order of 6 inches) capable of controllable flight using a gasoline or electric motor. See, for example, "New, Improved Plane Gives UF Tie at MAV Contest," The Florida Engineer, Summer 2002. As will be explained further below, each MAV 14 is equipped with video surveillance equipment and wireless communication equipment, neither of which is shown in FIG. 1 for clarity of illustration.

When commanded to do so, launcher 12 applies a sufficient force to launch one of MAVs 14 into the air at which point the onboard propulsion system (not shown in FIG. 1) of MAV 14 keeps it airborne. Given the minimal weight of each MAV 14, launcher 12 can be realized of a variety of simple spring-loaded mechanical launchers (e.g., catapult), gas-powered launchers, or any other low-power launcher, the choice of which is not a limitation of the present invention. Such launchers, are well known in the art and, therefore will not be described further herein.

Figure 1B:
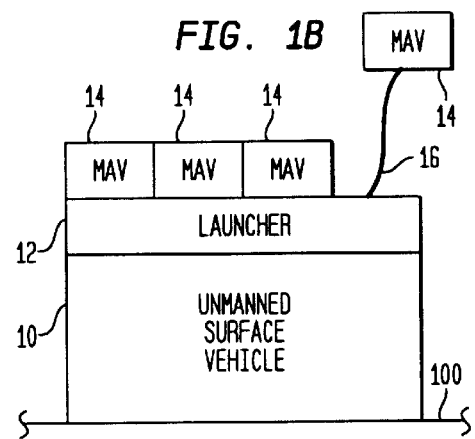

In operation, USV 10 navigates under autonomous or remote control to a desired location on earth surface 100 as shown in FIG. 1A. USV 10 could remain on dry land at all times or could transition from a wet environment to a beach location for covert reconnaissance operations. When reconnaissance is needed, launcher 12 is commanded to launch one of MAVs 14 into the air as illustrated in FIG. 1B. To check and initialize systems (e.g., flight propulsion and control systems, video surveillance systems, communication systems, etc.) prior to launch of one of MAVs 14, a hardwire link 16 can be provided between USV 10 and each MAV 14. Hardwire link 16 can be an umbilical-type of link/tether that remains coupled to MAV 14 prior to and during launch thereof, but then is uncoupled from MAV 14 once the MAV's propulsion and flight control systems are operational and the MAV has been launched.

Figure 1C:
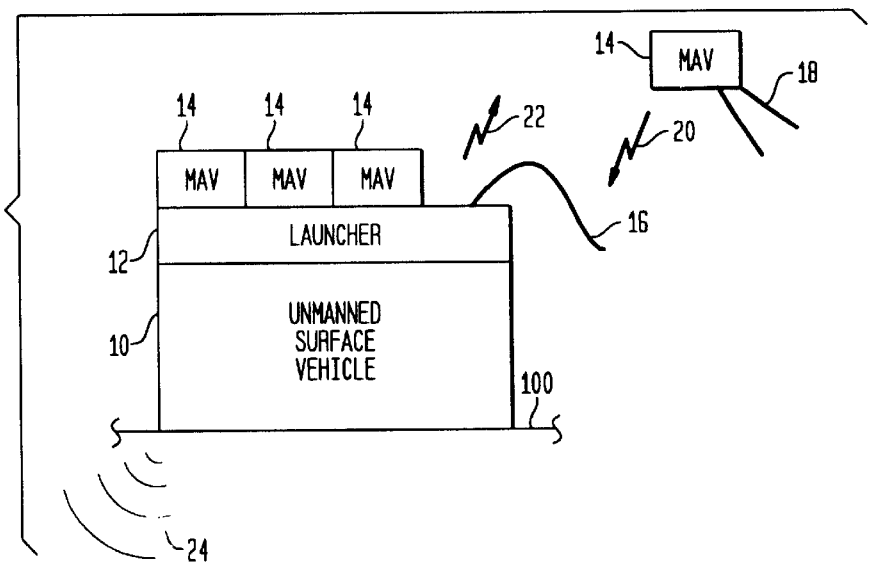

Referring now to FIG. 1C, the one MAV 14 launched into the air by launcher 12 is illustrated as being uncoupled from hardwire link 16 and flying under its own power. The video surveillance performed by the airborne one of MAVs 14 is indicated by field-of-view 18 while the wireless transmission of the video data captured is field-of-view 18 is indicated by arrow 20. Typically, wireless transmission 20 is a radio frequency (RF) transmission that can either be received at a remote location or by USV 10 for storage and/or re-transmission as indicated by arrow 22. If USV 10 is to re-transmit the video data, USV 10 could be equipped with higher power SATCOM or RF transmission means. Further, if surface 100 is a water surface, USV 10 could be equipped with acoustic or other underwater communications systems capable of transmitting signals 24 under (water) surface 100.

Figure 1D:
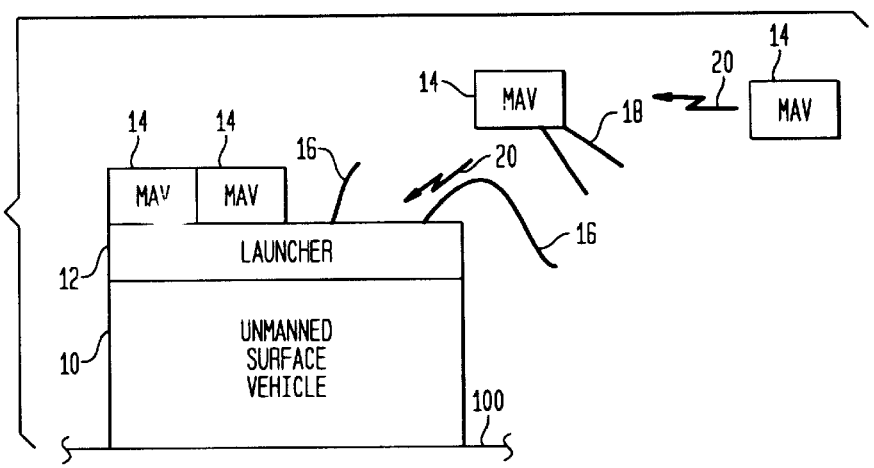

The above-described process can be repeated for each of the remaining MAVs 14 that are still coupled to USV 10. As illustrated in FIG. 1D, a second MAV 14 can be launched into the air when, for example, i) video reconnaissance of a different area is required, ii) the first launched MAV 14 runs out of power or otherwise fails, or iii) a communication relay is needed to support transmission of video data 20 from the first and/or second launched MAV 14.

Figure 2:
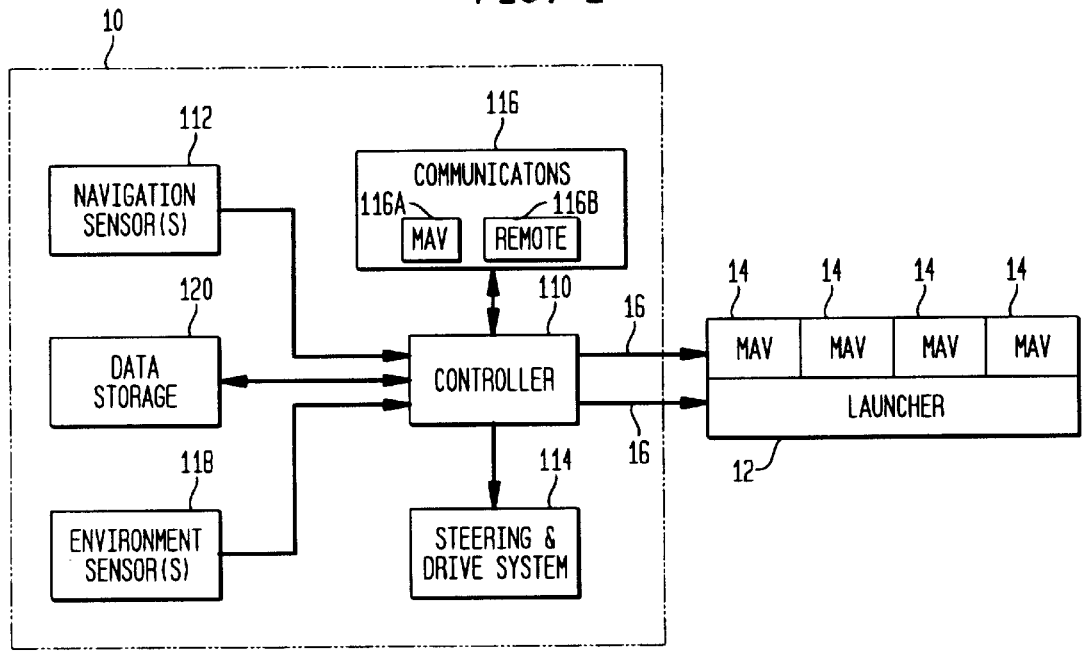
FIG. 2 is a functional block diagram of an unmanned surface vehicle for use in the present invention.

Referring additionally now to FIG. 2, an embodiment of USV 10 for supporting the above-described operational scenario is shown in block diagram form. At the heart of USV 10 is a controller 110 that orchestrates all activity onboard USV 10. More specifically, controller 110 performs navigation functions, controls motion of USV 10, commands launches of MAVs 14, oversees image data communications and video data transmissions, and controls video data storage/retrieval. Controller 110 can be realized by one central control computer or by individual control computers for each major function performed by USV 10.

In terms of navigation and motion of USV 10, navigation sensor(s) 112 are coupled to controller 110 and can include a compass for reading vehicle headings, wheel encoders for measuring distance traveled, a GPS receiver, and inertial sensors. Readings from these sensor/receivers are used by controller 110 in ways well known in the art (e.g., GPS receiver provides long baseline navigation while compass, wheel encoders and inertial sensors are used for dead reckoning) to determine an accurate position of USV 10 at all times. Controller 110 uses the determined position to adjust a steering and drive system 114 so that USV 10 is navigated along a desired path to a destination. The desired path and destination can be pre-programmed into controller 110 in which case USV 10 moves in a completely autonomous fashion. Another option is to control USV 10 from a remote location. Accordingly, a communications module 116 can include separate communications 116A and 116B where communications 116A is used to communicate between MAVs 14 and communications 116B is used to communicate with a remote location. Ideally, both communications can occur simultaneously and uninterrupted.

Environmental sensor(s) 118 can include sensors for collecting data about the environment in which USV 10 resides (e.g., motion, acoustic, seismic, temperature, video, etc.) as well as sensors used during the movement of USV 10 (e.g., collision sensing, collision avoidance, video, etc.). For example, once USV 10 reaches its desired destination, controller 110 can place itself and systems coupled thereto in a "sleep" mode to conserve power while environmental sensor(s) 118 "listen" for environment changes that signal the need for reconnaissance, at which point controller 110 wakes the needed onboard systems. The collected data could also be stored onboard USV 10 using data storage 120.

Controller 110 is coupled to launcher 12 and is also coupled to each MAV 14 (only one of which is shown in FIG. 2) via hardwire link 16. As mentioned above, hardwire link 16 is used to activate and check the various flight systems onboard MAV 14 prior to the launching thereof by launcher 12.

Figure 3:
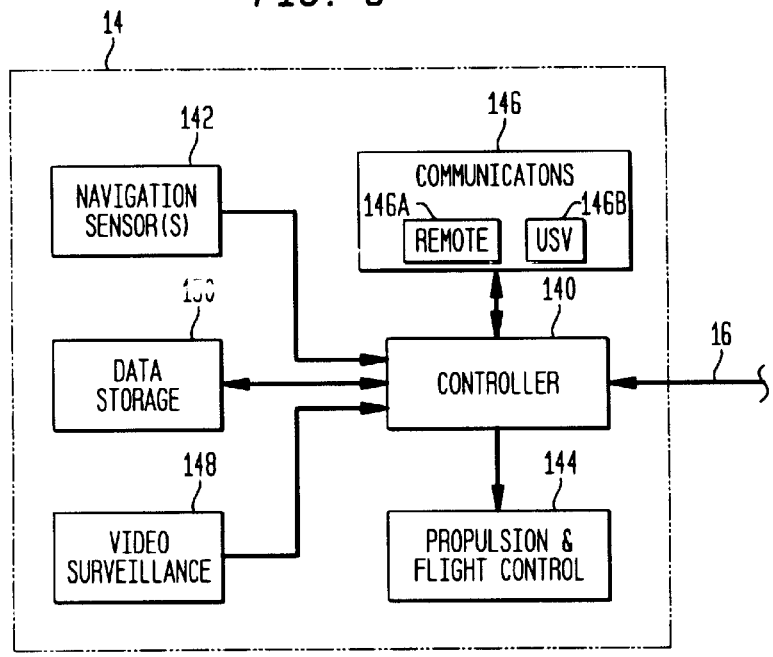
FIG. 3 is a functional block diagram of an unmanned micro-aerial vehicle for use in the present invention.

Referring to FIG. 3, an embodiment of MAV 14 for supporting the reconnaissance aspect of the present invention is shown in block diagram form. A controller 140 oversees all of the functions of MAV 14 that can include autonomous flight control, remote-operator controlled flight, communications, video surveillance and data storage. In terms of its flying operations, MAV 14 includes navigation sensor(s) 142 (e.g., compass, altimeter, GPS, inertial, etc.) for providing position information to controller 140 which, in turn, uses such position to implement a flight plan using the MAV's propulsion and flight control 144 (e.g., motor or engine, propeller, control surfaces, etc.) The flight plan can be pre-programmed into controller 140 or could be provided remotely from USV 10 or some other location. Accordingly, a communications module 146 can include communications 146A for communication with a remote base location (that can be in the air, on the ground or on the water) and communications 146B for communication with just USV 10. Since two-way communication would be required, each of communications 146A and 146B can be realized by an RF transceiver.

Once MAV 14 is airborne, controller 140 activates video surveillance 148 which typically includes a miniature camera (e.g., standard image, thermal starlight, etc.) and video processor. The video data is passed to controller 140 which can store some or all thereof at data storage 150 and/or have some transmitted from MAV 14 using communications module 146.

Controller 140 is also coupled to hardwire link 16 as described above. Just prior to launch of MAV 14, controller 140 receives wake commands via hardwire link 16. Such wake commands could be detailed with respect to each system onboard MAV 14 or could simply be one command that triggers that start of an operational program stored on controller 140. At a minimum, navigation sensor(s) 142 and propulsion/flight control 144 are activated prior to launch of MAV 14. Note that hardwire link 16 could also be used to check the integrity of each system onboard MAV 14 prior to launch thereof. Then, if a failure is detected, another one of the MAVs 14 could be launched.

As mentioned above, the present invention could also function as a communications system with the hardware provided on each of USV 10 and MAVs 14 being the same as the already described. Accordingly, simultaneous reference will be made to FIGS. 1–3 in order to explain the operation of the present invention's use as a communications system. In essence, data collected autonomously by USV 10 over a period of time is transmitted by an airborne one of MAVs 14. Thus, no personnel need be present to perform data collection and line-of-sight transmission distance is greatly increased by the airborne MAV 14.

The data collected by USV 10 (e.g., by its environmental sensor(s) 118) can be transferred to one of MAVs 14 for airborne transmission therefrom in one of two ways. First, collected data could be stored onboard USV 10 using data storage 120. Then, when one of MAVs 14 is airborne, the collected data could be transmitted thereto using the communications link formed by the combination of communications 116A and 146B. MAV 14 would then re-transmit the data using communications 146A. Note that the use of separate communications links allows the data to be relayed nearly simultaneously.

The second way collected data could be transferred to one of MAVs 14 involves storing the collected data onboard MAV 14 (using data storage 150) prior to launching MAV 14. Then, at a predetermined time, or when data storage 150 is at capacity, MAV 14 is launched into the air where transmission to a remote location occurs using communications 146A. Once airborne, transfer of collected data to MAV 14 could then occur as described in the first method. Note that USV 10 could simultaneously store the collected data using data storage 120 for archive purposes, for re-transmission, or if the airborne one of MAVs 14 experiences a failure.

The present invention's communication aspect could also use USV 10 as a data collection node for a large number of surface-based reconnaissance vehicles. This scenario is depicted in FIG. 4 where USV 10 is deployed at earth surface 100 and is equipped as previously described. Deployed on surface 100 (or under surface 100 in the case of a water environment) are a number of surveillance vehicles 11, each of which is equipped with sensor(s) 11A for sensing information such as environmental conditions and communications. 11B for transferring sensed information to USV 10. In situations where surveillance vehicles 11 are on a ground or water surface, communications 11B can be RF communications that transmit the information for receipt by (RF) communications 116B onboard USV 10. However, if surveillance vehicles are deployed underwater, communications 11B can be an acoustic transmitter and communications 116B can be an acoustic receiver (or transceiver if two-way communication with surveillance vehicles 11 is required). The information collected by USV 10 in this fashion can then be transferred to an MAV 14 for airborne transmission thereof as described above.

The advantages of the present invention are numerous. Personnel are kept out of dangerous, remote and/or time consuming data reconnaissance situations. Thus, the present invention is safer and cheaper than existing personnel-based reconnaissance and/or communications system. The use of high-cost satellite communications is not required. Further, by equipping each USV with multiple MAVs, the present invention presents a long-term solution to providing covert reconnaissance and improved long-range communications with unmanned reconnaissance vehicle(s).

Although the invention has been described relative to a specific embodiment thereof, there are numerous variations and modifications that will be readily apparent to those skilled in the art in light of the above teachings. For example, USV 10 could remain underwater at all times with launcher 12 being a buoyant platform that could be released from USV 10. Upon such release, the buoyant launching platform would float to the water's surface, launch it's MAV(s), and then be scuttled and sink below the water's surface. It is therefore to be understood that, within the scope of the appended claims, the invention may be practiced other than as specifically described.

What is claimed as new and desired to be secured by Letters Patent of the United States is:

1. A reconnaissance system, comprising:
   an unmanned surface vehicle (USV) capable of navigated movement on an earth surface;
   at least one micro-aerial vehicle (MAV) equipped for unmanned flight after a launch thereof, each said MAV mounted on said USV, each said MAV having wireless communication means coupled to video surveillance means; and
   launching means mounted on said USV for launching each said MAV into the air, wherein each said MAV so-launched into the air collects video data using said video surveillance means and transmits said video data using said wireless communication means.

2. A reconnaissance system as in claim 1 wherein each said MAV includes a motor for in-air propulsion, and wherein said reconnaissance system further comprises a hardwired link coupling said USV to said motor when said MAV is mounted on said USV, wherein said motor is started via a command received from said USV and wherein said hardwired link is uncoupled from said motor when said MAV is launched into the air.

3. A reconnaissance system as in claim 1 wherein each said MAV further comprises:
   navigation means for generating in-air positions of said MAV; and
   flight control means coupled to said navigation means for steering said MAV using said in-air positions.

4. A reconnaissance system as in claim 1 wherein said wireless communication means comprises:
   a first RF transceiver for communication with said USV; and
   a second RF transceiver for communication with a remote location that is at least one of an in-air location, an on-the-water location and an on-the-ground location.

5. A reconnaissance system as in claim 1 wherein said USV includes pre-programmed means for controlling said navigated movement in an autonomous fashion.

6. A reconnaissance system as in claim 1 wherein said USV includes means for receiving instructions from a location that is remote with respect to said USV wherein said instructions govern said navigated movement.

7. A reconnaissance system, comprising:
   an unmanned surface vehicle (USV) having means for controlling movement thereof on an earth surface;
   a plurality of micro-aerial vehicles (MAVs) onboard said USV, each said plurality of MAVs having flight control means, radio frequency (RF) communication means and video surveillance means mounted thereon;
   launching means mounted on said USV for launching each of said plurality of MAVs into the air; and
   launch control means mounted on said USV and coupled to said launching means and each of said plurality of MAVs, wherein said launch control means activates said flight control means, said video surveillance means and said RF communication means for a corresponding one of said plurality of MAVs just prior to the launch thereof, wherein each of said plurality of MAVs so-launched into the air collects video data using said video surveillance means and transmits said video data using said RF communication means.

8. A reconnaissance system as in claim 7 wherein said USV further includes wireless communication means mounted thereon for relaying said video data so-transmitted from each of said plurality of MAVs to a remote location.

9. A reconnaissance system as in claim 8 wherein said wireless communication means uses at least one of satellite-based communications, RF-based communications and acoustic-based communications.

10. A reconnaissance system as in claim 7 wherein said means for controlling movement operates autonomously.

11. A reconnaissance system as in claim 7 wherein said means for controlling movement is operated from a location that is remote with respect to said USV.

12. A method of reconnoitering, comprising the steps of:
providing an unmanned surface vehicle (USV) capable of navigated movement on an earth surface;
providing a plurality of micro-aerial vehicles (MAVs) onboard said USV, each said plurality of MAVs having flight control means, radio frequency (RF) communication means and video surveillance means mounted thereon;
activating said flight control means of a corresponding one of said plurality of MAVs;
launching said corresponding one into the air;
activating said RF communication means and said video surveillance means for said corresponding one so-launched into the air;
collecting video data using said video surveillance means so-activated; and
transmitting said video data using said RF communication means so-activated.

13. A method according to claim 12 wherein said USV is equipped for wireless communication, and wherein said method further comprises the steps of:
receiving said video data transmitted from said corresponding one of said plurality of MAVs; and
re-transmitting said video data using said wireless communication to a location remote with respect to said USV.

14. A method according to claim 13 wherein said step of re-transmitting uses at least one of satellite-based communications, RF-based communications and acoustic-based communications.

15. A method according to claim 12 further comprising the step of remotely controlling said navigated movement of said USV.

16. A method according to claim 15 further comprising the step of remotely controlling said step of activating said flight control means and said step of launching.

* * * * *